US012305629B2

(12) United States Patent
Shirai et al.

(10) Patent No.: US 12,305,629 B2
(45) Date of Patent: May 20, 2025

(54) DIAPHRAGM PUMP

(71) Applicant: MABUCHI MOTOR OKEN CO., LTD., Tokyo (JP)

(72) Inventors: Masatsugu Shirai, Tokyo (JP); Kazuki Itahara, Tokyo (JP)

(73) Assignee: MABUCHI MOTOR OKEN CO., LTD., Tokyo (JP)

( * ) Notice: Subject to any disclaimer, the term of this patent is extended or adjusted under 35 U.S.C. 154(b) by 78 days.

(21) Appl. No.: 18/307,574

(22) Filed: Apr. 26, 2023

(65) Prior Publication Data
US 2023/0349372 A1 Nov. 2, 2023

(30) Foreign Application Priority Data
Apr. 28, 2022 (JP) ................................ 2022-074231

(51) Int. Cl.
*F04B 43/00* (2006.01)
*F04B 53/10* (2006.01)
*F16K 15/14* (2006.01)
*F04B 43/04* (2006.01)

(52) U.S. Cl.
CPC ...... *F04B 43/0045* (2013.01); *F04B 43/0063* (2013.01); *F04B 43/009* (2013.01); *F04B 53/1065* (2013.01); *F16K 15/148* (2013.01); *F04B 43/04* (2013.01); *F04B 53/10* (2013.01); *F04B 2201/0605* (2013.01)

(58) Field of Classification Search
CPC ............. F04B 43/0045; F04B 43/0063; F04B 43/009; F04B 43/04; F04B 53/1065; F04B 53/10; F04B 2201/0605; F04B 53/1037; F16K 15/148

USPC .................................. 417/440, 441, 569–571
See application file for complete search history.

(56) References Cited

U.S. PATENT DOCUMENTS

| 5,857,839 A * | 1/1999 | Fisher | F04B 27/1009 137/856 |
| 5,871,337 A * | 2/1999 | Fukanuma | F04B 27/1009 417/571 |
| 6,595,758 B1 * | 7/2003 | Hauser | F04B 39/062 417/440 |
| 7,444,990 B1 * | 11/2008 | Fisher | F16K 15/063 123/516 |
| 2016/0108902 A1 * | 4/2016 | Cai | F04B 43/0045 417/273 |
| 2018/0363646 A1 * | 12/2018 | Inoue | F04B 43/0054 |
| 2019/0120391 A1 * | 4/2019 | Takehana | F02M 37/046 |

FOREIGN PATENT DOCUMENTS

JP 62-043535 Y2 11/1987
JP 2001-073953 A 3/2001

* cited by examiner

*Primary Examiner* — Charles G Freay
(74) *Attorney, Agent, or Firm* — WOMBLE BOND DICKINSON (US) LLP

(57) ABSTRACT

A diaphragm pump converts rotation of a motor into a reciprocating motion and drives a diaphragm. The diaphragm pump includes a partition configured to form a pump chamber together with a deformation portion of the diaphragm, a suction passage communicating with the pump chamber via a suction through hole extending through the partition, and a suction valve configured to open/close the suction passage. The valve body of the suction valve includes a leak structure configured to form a channel between the valve body and the seat surface of the partition.

5 Claims, 3 Drawing Sheets

DIAPHRAGM PUMP

BACKGROUND OF THE INVENTION

The present invention relates to a diaphragm pump including a suction valve that comes into contact with or separates from the seat surface of a valve seat.

There is a diaphragm pump configured to drive a diaphragm by converting the rotation of a motor into a reciprocating motion. To reduce a discharge flow rate in a diaphragm pump of this type, a method of reducing the rotation speed of a motor by lowering a voltage applied to the motor is often employed.

To suppress the discharge flow rate to a remarkably low flow rate by this method, the voltage applied to the motor needs to be considerably lowered. However, if the applied voltage is considerably lowered, the motor stops because of shortage of torque, or the rotation becomes unstable to make the pulsation of the pump motion large. It is therefore impossible to obtain a stable low flow rate. Hence, it is difficult to suppress the discharge flow rate to a considerably low flow rate, for example, 3% of the rated flow rate.

The present inventor considered that the above-described problem can be solved to some extent by providing the diaphragm pump with a leak structure for intentionally leaking the pressure in a pump chamber. This is because even if the voltage applied to the motor is not considerably lowered to such a point that the motor stops due to shortage of torque, or the rotation becomes unstable, the discharge flow rate can be suppressed low because a fluid leaks from the leak structure.

For another purpose, a diaphragm pump with a leak structure is disclosed in Japanese Utility Model Publication No. 62-43535 (literature 1) and Japanese Patent Laid-Open No. 2001-73953 (literature 2). In literature 1, a convex portion is provided on a base that holds a diaphragm. When the diaphragm is brought into tight contact with the base, a gap is formed at an end of the convex portion. A fluid partially leaks from this gap. In literature 2, a convex portion is provided on the valve seat of a check valve. Even in a state in which the check valve is closed, a gap is formed around the convex portion, and a fluid slightly flows out from the gap.

However, in the leak structure disclosed in literature 1, if a foreign substance is put in the gap between the diaphragm and the convex portion on the base, the foreign substance cannot be removed basically, and therefore, the discharge flow rate cannot be reduced. For this reason, performance may be unstable in the diaphragm pump with the leak structure.

In the leak structure disclosed in literature 2, since the hardness of the valve seat is higher than the hardness of the check valve, the valve body of the check valve that repetitively comes into contact with the convex portion wears, and dust is generated. For this reason, durability performance is low in the diaphragm pump with the leak structure.

SUMMARY OF THE INVENTION

It is an object of the present invention to provide a diaphragm pump capable of suppressing a discharge flow rate to a remarkably low flow rate and improving performance stability and durability performance.

In order to achieve the above object of the present invention, there is provided a diaphragm pump comprising a diaphragm including a deformation portion having a cup shape, a partition configured to close an opening portion of the deformation portion and form a pump chamber together with the deformation portion, a suction through hole extending through the partition, a suction passage communicating with the pump chamber via the suction through hole, a discharge through hole extending through the partition, a discharge passage communicating with the pump chamber via the discharge through hole, a driving mechanism configured to convert rotation of a motor into a reciprocating motion and alternately deform the deformation portion in a direction of increasing a capacity of the pump chamber and in a direction of decreasing the capacity of the pump chamber, a suction valve attached to the partition and configured to open the suction passage in a stroke of increasing the capacity of the pump chamber and close the suction passage in a stroke without increasing the capacity, and a discharge valve attached to the partition in the discharge passage and configured to open the discharge passage in a stroke of decreasing the capacity of the pump chamber and close the discharge passage in a stroke without decreasing the capacity, wherein the partition includes a seat surface on a side facing the pump chamber, and the suction valve includes a valve body configured to come into contact with or separate from the seat surface, and the valve body includes a leak structure configured to form a channel between the valve body and the seat surface.

DESCRIPTION OF THE PREFERRED EMBODIMENTS

A diaphragm pump according to an embodiment of the present invention will now be described in detail with reference to FIGS. 1 to 5.

Figure 1:
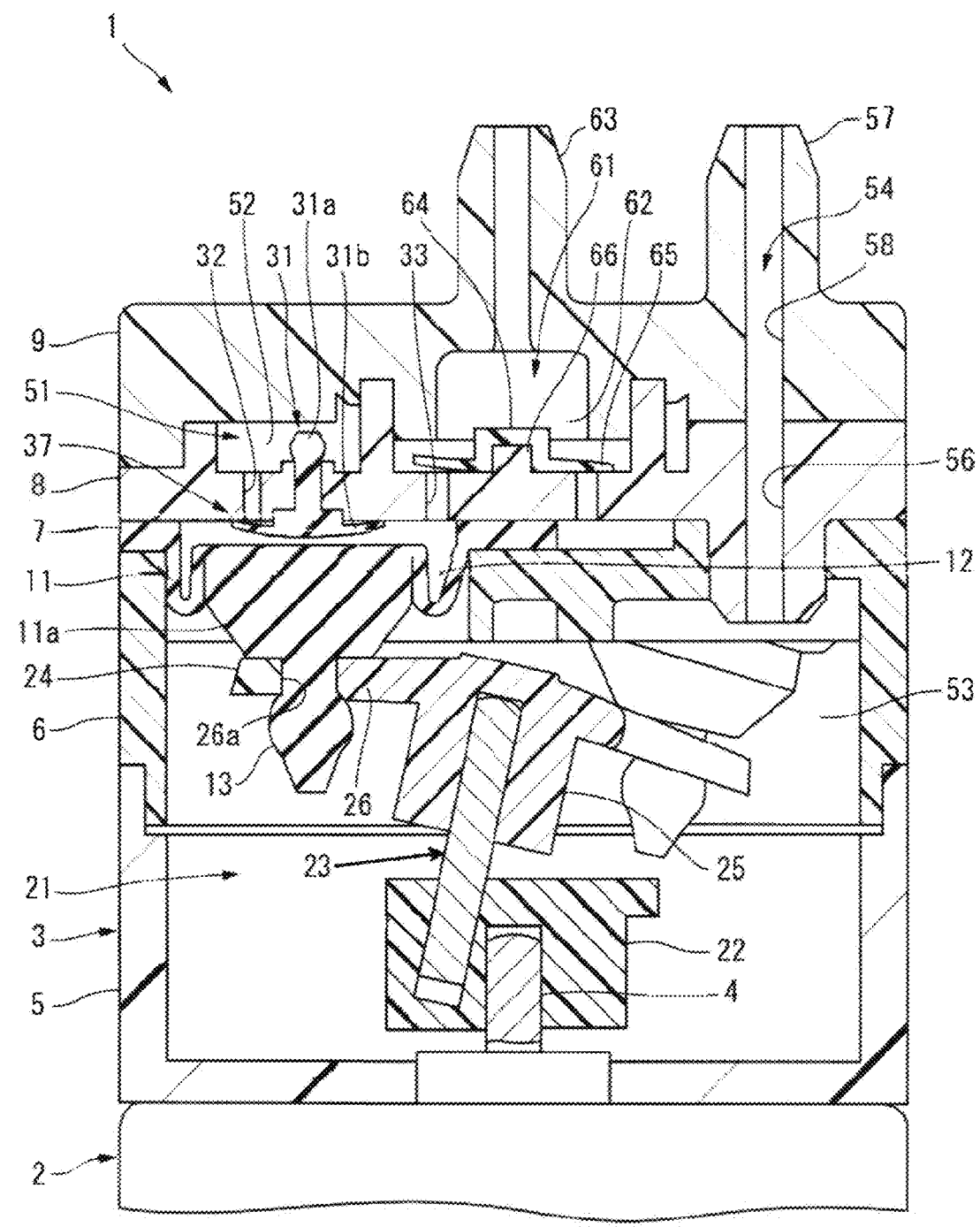
FIG. 1 is a sectional view of a diaphragm pump according to the first embodiment of the present invention.

A diaphragm pump 1 shown in FIG. 1 is attached to a motor 2 located at the lowermost position in FIG. 1, and is driven by the motor 2. The diaphragm pump 1 according to this embodiment is a pump that sucks and discharges air.

The diaphragm pump 1 includes a housing 3 fixed to the motor 2. Functional components that constitute the diaphragm pump 1 are held by the housing 3. The housing 3 is formed into a columnar shape by combining a plurality of members in the axial direction of the motor 2 and located on the same axis as a rotation shaft 4 of the motor 2.

The plurality of members that constitute the housing 3 include a bottom body 5, a diaphragm holder 6, a valve holder 8, a lid body 9, and the like. The bottom body 5 is a member that has a bottomed cylindrical shape and is attached to the motor 2. The diaphragm holder 6 is attached to the opening portion of the bottom body 5. The valve holder 8 is a disc-shaped member (partition) attached to the diaphragm holder 6 in a state in which a diaphragm 7 to be described later is sandwiched between the valve holder 8 and the diaphragm holder 6. The lid body 9 is attached to the valve holder 8 while being overlaid on the valve holder 8.

The diaphragm 7 is held while being sandwiched between the diaphragm holder 6 and the valve holder 8. The diaphragm 7 includes a plurality of cup-shaped deformation portions 11 opening to the valve holder 8. The deformation portion 11 is arranged in each of a plurality of regions formed by dividing the diaphragm 7 in the circumferential direction of the housing 3. The opening portion of the deformation portion 11 is closed by the valve holder 8, and a pump chamber 12 is formed between the deformation portion 11 and the valve holder 8. That is, the valve holder 8 forms the pump 12 together with the deformation portion 11. A connecting piece 13 projecting in a direction opposite to the pump chamber 12 is provided on a bottom wall 11a of the deformation portion 11 having a cup shape. A driving mechanism 21 is connected to the connecting piece 13.

The driving mechanism 21 includes a crank body 22 attached to the rotation shaft 4 of the motor 2, a driving body 24 connected to the crank body 22 via a driving shaft 23, and the like. The crank body 22 is fixed to the rotation shaft 4, and rotates integrally with the rotation shaft 4. The driving shaft 23 is fixed to an eccentric portion of the crank body 22 while tilting with respect to the rotation shaft 4 of the motor 2. The tilting direction of the driving shaft 23 is a direction in which the eccentric amount to the rotation shaft 4 becomes small at the distal end portion of the driving shaft 23.

The driving body 24 includes a columnar shaft portion 25 connected to the driving shaft 23, and a plurality of arm portions 26 projecting from the shaft portion 25 outward in the radial direction. The arm portion 26 is provided for each deformation portion 11 of the diaphragm 7, and extends radially from the shaft portion 25 outward in the radial direction. A through hole 26a is formed in the arm portion 26. The connecting piece 13 of the diaphragm 7 is engaged in the through hole 26a. The connecting piece 13 extends through the arm portion 26 and is fixed to the arm portion 26 in this state. Hence, the arm portion 26 is connected to each of the plurality of deformation portions 11 of the diaphragm 7.

According to the driving mechanism 21, when the rotation shaft 4 of the motor 2 rotates, the crank body 22 and the driving shaft 23 rotate about the rotation shaft 4. At this time, since the rotation of the driving body 24 is impeded by the diaphragm 7, the driving body 24 swings along with a change of the tilting direction of the driving shaft 23. By this swing, the arm portion 26 pushes or pulls the deformation portion 11. In this way, the driving body 24 converts the rotation of the rotation shaft 4 into a reciprocating motion and transmits it to the deformation portion 11.

If the deformation portion 11 of the diaphragm 7 is pulled by the arm portion 26 to the side of the motor 2, and the deformation portion 11 expands, the capacity of the pump chamber 12 increases. On the other hand, if the deformation portion 11 of the diaphragm 7 is pushed by the arm portion 26 to the side of the valve holder 8, and the deformation portion 11 contracts, the capacity of the pump chamber 12 decreases. For this reason, when the crank body 22 continuously rotates, a state in which the capacity of the pump chamber 12 increases and a state in which the capacity decreases are alternately repeated.

Figure 2:
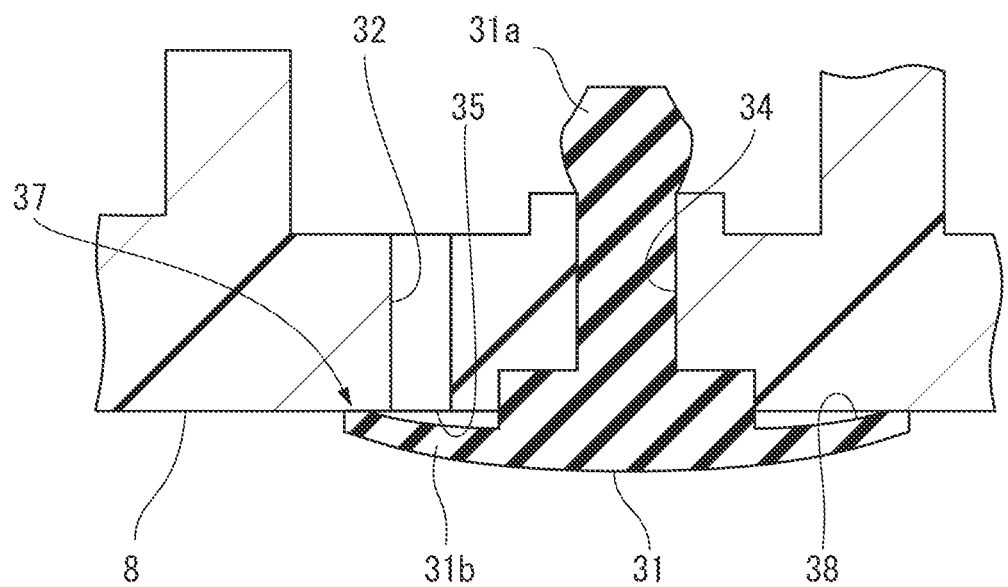
FIG. 2 is a sectional view of a part of a suction valve and a valve holder.

A suction through hole 32 and a discharge through hole 33 are formed in a portion of the valve holder 8, which forms the wall of the pump chamber 12. A suction valve 31 is provided near the suction through hole 32. The suction valve 31 is made of a rubber material and attached to the valve holder 8 for each pump chamber 12. As shown in FIG. 2, the suction valve 31 according to this embodiment includes a shaft portion 31a inserted into the shaft hole 34 formed in the valve holder 8 and fixed to the valve holder 8, and a valve body 31b that comes into contact with or separates from a seat surface 35 of a valve seat formed on the valve holder 8. The seat surface 35 is a smooth surface formed on a side of the valve holder 8 facing the pump chamber 12.

Figure 3:
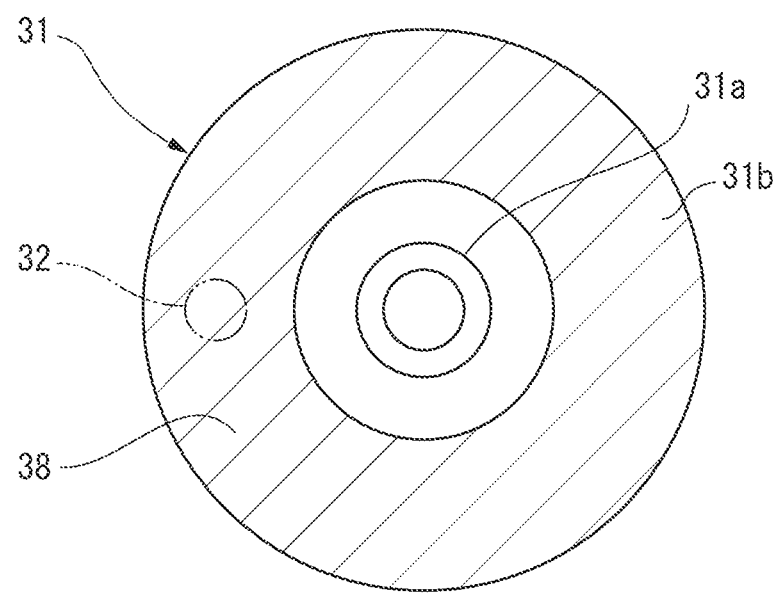
FIG. 3 is a plan view of the suction valve.

The valve body 31b of the suction valve 31 is formed into an annular plate shape, as shown in FIG. 3. As shown in FIG. 2, the valve body 31b according to this embodiment is formed into a shape that is curved to gradually approach the seat surface 35 toward the outer edge.

Figure 4:
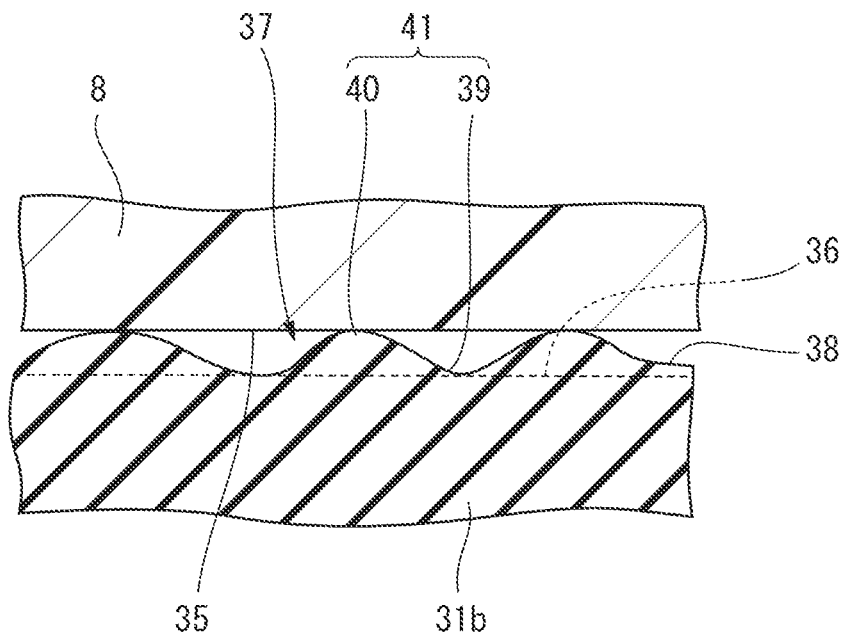
FIG. 4 is an enlarged sectional view of a part of the suction valve.

Also, as shown in FIG. 4, the valve body 31b includes a leak structure 37 configured to form a minute channel 36 between the valve body 31b and the seat surface 35. The valve body 31b includes a seal surface 38 facing the seat surface 35, and the leak structure 37 is constituted by an unevenness 41 formed by concave portions 39 and convex portions 40 provided all over the seal surface 38. The seal surface 38 is formed in a range indicated by hatching in FIG. 3. In FIG. 4, the unevenness 41 is drawn by a wavy curved line to help understanding of the configuration of the leak structure 37. However, an angled portion or a valley portion having a steep tilting surface may exist in the unevenness 41.

Note that as long as the channel 36 from the suction through hole 32 into the pump chamber 12 is formed, the leak structure 37 formed by the unevenness 41 need not always be provided all over the seal surface 38. For example, the leak structure 37 formed by the unevenness 41 may be provided only on the outer edge portion of the seal surface 38, which comes into contact with the seat surface 35 when the suction valve 31 closes the suction through hole 32.

Figure 5:
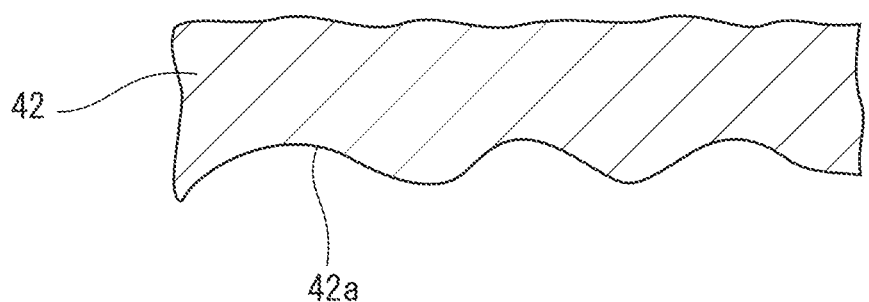
FIG. 5 is an enlarged sectional view of a part of a mold.

The valve body 31b is molded using a mold 42 shown in FIG. 5. The mold 42 includes a molding surface 42a for emboss processing. The unevenness 41 of the valve body 31b is an unevenness formed by transferring the shape of the molding surface 42a of the mold 42. That is, the unevenness 41 is formed by performing emboss processing on the seal surface 38 when molding the valve body 31b using the mold 42 that molds the valve body 31b into a desired shape. The surface shape of the unevenness 41 formed by emboss processing is, for example, a leather pattern, a wood pattern, a rock grain pattern, a sand pattern, a satin pattern, or a geometric pattern.

As shown in FIG. 1, the suction through hole 32 is a hole that extends through the valve holder 8 to communicate the pump chamber 12 with a suction passage 51 to be described later. The opening of the suction through hole 32 on the side of the pump chamber 12 is opened/closed by the valve body 31b of the suction valve 31. When the valve body 31b separates from the opening, the suction passage 51 is opened. When the valve body 31b closes the opening, the suction passage 51 is closed. In a stroke of increasing the capacity of the pump chamber 12, the valve body 31b separates from the opening. In remaining strokes, the valve body 31b closes the opening. That is, the suction valve 31 opens the suction passage 51 (or the suction through hole 32) in the stroke of increasing the capacity of the pump chamber 12, and closes the suction passage 51 (or the suction through hole 32) in the remaining strokes. The remaining strokes are strokes without the increase of the capacity of the pump chamber 12, and include a stroke of decreasing the capacity of the pump chamber 12, and a stroke of maintaining the capacity.

The suction passage 51 is formed by a suction fluid chamber 52 to which the suction through hole 32 opens, a driving mechanism storing chamber 53 in the housing 3, which is connected to the suction fluid chamber 52 via a communicating path (not shown), and an inlet passage 54 extending, from the driving mechanism storing chamber 53, through the valve holder 8 and the lid body 9. The suction fluid chamber 52 is formed between the valve holder 8 and the lid body 9. The driving mechanism storing chamber 53 is a space in which the driving mechanism 21 is stored. The inlet passage 54 is formed by a through hole 56 formed in the valve holder 8, and a through hole 58 including the hollow portion of a suction pipe 57 provided in the lid body 9.

The discharge through hole 33 is a hole that extends through the valve holder 8 to communicate the pump chamber 12 with a discharge passage 61. The discharge passage 61 is formed by a discharge fluid chamber 62 formed at the center between the valve holder 8 and the lid body 9, and a discharge pipe 63 projecting at the axial portion of the lid body 9.

In the discharge passage 61, a discharge valve 64 is attached to the valve holder 8. The discharge valve 64 has a so-called hat shape and is made of a rubber material. The discharge valve 64 includes a valve body 65 that has an annular plate shape and opens/closes the opening of the discharge through hole 33, and is fitted on a projection 66 of the valve holder 8 and is fixed to the valve holder 8.

The opening of the discharge through hole 33 on the side of the discharge fluid chamber 62 is opened/closed by the valve body 65 of the discharge valve 64. When the valve body 65 separates from the opening, the discharge passage 61 is opened. When the valve body 65 closes the opening, the discharge passage 61 is closed. In a stroke of decreasing the capacity of the pump chamber 12, the valve body 65 separates from the opening. In remaining strokes, the valve body 65 closes the opening. That is, the discharge valve 64 opens the discharge passage 61 (or the discharge through hole 33) in the stroke of decreasing the capacity of the pump chamber 12, and closes the discharge passage 61 (or the discharge through hole 33) in the remaining strokes. The remaining strokes are strokes without the decrease of the capacity of the pump chamber 12, and include a stroke of increasing the capacity of the pump chamber 12, and a stroke of maintaining the capacity.

In the discharge stroke in which the discharge valve 64 is opened, and air in the pump chamber 12 is discharged to the discharge passage 61, the valve body 31b of the suction valve 31 is pressed against the seat surface 35 by the pressure in the pump chamber 12. At this time, the seal surface 38 of the valve body 31b comes into contact with the seat surface 35. The minute channel 36 is formed on the seal surface 38.

In the discharge stroke in which the capacity of the pump chamber 12 decreases, if the rising speed of the pressure in the pump chamber 12 is relatively high, that is, if the rotation speed of the motor 2 is relatively high, the channel 36 substantially functions as a diaphragm, and the amount of air that leaks from the pump chamber 12 to the suction passage 51 via the channel 36 becomes relatively small. For this reason, the discharge flow rate of the diaphragm pump 1 in this case is a flow rate substantially corresponding to the rotation speed of the motor 2.

On the other hand, if the rotation speed of the motor 2 is relatively low, more specifically, if the rotation speed is as low as not to make the motor 2 stop due to shortage of torque or not to make the rotation unstable, the amount of air that leaks from the pump chamber 12 to the suction passage 51 via the channel 36 in the discharge stroke increases. For this reason, while rotating the motor 2 at the minimum rotation speed that is as low as not to make the motor 2 stop or not to make the rotation unstable, the discharge flow rate of the diaphragm pump 1 can be decreased as compared to a case where the leak structure 37 is not provided.

The seat surface 35 which the valve body 31b of the suction valve 31 comes into contact with or separates from is formed into a smooth surface. Hence, the leak structure 37 of the valve body 31b that repetitively comes into contact with the seat surface 35 hardly wears. The difficulty in wear means that dust is generated little, and the durability is high. In a case where a foreign substance is put in the leak structure 37, when the valve body 31b moves along with opening/closing, the foreign substance drops from the leak structure 37 and is thus removed. For this reason, the leak structure 37 has high stability. Hence, according to this embodiment, it is possible to provide a diaphragm pump capable of suppressing the discharge flow rate to a remarkably low flow rate and improving performance stability and durability performance.

The leak structure 37 according to this embodiment is formed by the unevenness 41 provided all over the seal surface 38 of the valve body 31b. Hence, since air can be leaked from the whole region of the seal surface 38, the discharge flow rate can be further decreased at the low rotation speed.

The unevenness 41 according to this embodiment is an unevenness formed by transferring the shape of the molding surface 42a for emboss processing, which is provided on the mold 42 used to mold the valve body 31b. For this reason, the unevenness 41 having a complex shape can easily be formed, and the unevenness 41 according to the performance of the diaphragm pump 1 can easily be formed.

Aspect of Present Invention

According to one aspect of the present invention, there is provided a diaphragm pump (1) comprising a diaphragm (7) including a deformation portion (11) having a cup shape, a partition (8) configured to close an opening portion of the deformation portion (11) and form a pump chamber (12) together with the deformation portion (11), a suction through hole (32) extending through the partition (8), a suction passage (51) communicating with the pump chamber (12) via the suction through hole (32), a discharge through hole (33) extending through the partition (8), a discharge passage (61) communicating with the pump chamber (12) via the discharge through hole (33), a driving mechanism (21) configured to convert rotation of a motor (2) into a reciprocating motion and alternately deform the deformation portion (11) in a direction of increasing a capacity of the pump chamber (12) and in a direction of decreasing the capacity of the pump chamber (12), a suction valve (31) attached to the partition (8) and configured to open the suction passage (51) (or the suction through hole (32)) in a stroke of increasing the capacity of the pump chamber (12) and close the suction passage (51) (or the suction through hole (32)) in a stroke without increasing the capacity, and a discharge valve (64) attached to the partition (8) in the discharge passage (61) and configured to open the discharge passage (61) (or the discharge through hole (33)) in a stroke of decreasing the capacity of the pump chamber (12) and close the discharge passage (61) (or the discharge through hole (33)) in a stroke without decreasing the capacity, wherein the partition (8) includes a seat surface (35) on a side facing the pump chamber (12), and the suction valve (31) includes a valve body (31b) configured to come into contact with or separate from the seat surface (35), and the valve body (31b) includes a leak structure (37) configured to form a channel (36) between the valve body (31b) and the seat surface (35).

When a fluid leaks from the leak structure (37) of the valve body (31b), the discharge flow rate can be suppressed small. Also, even if the leak structure (37) of the valve body (31b) repetitively comes into contact with the seat surface (35) of the partition (8), the leak structure (37) hardly wears. Furthermore, in a case where a foreign substance is put in the leak structure (37), when the valve body (31b) moves along with opening/closing, the foreign substance drops from the leak structure (37) and is thus removed. It is therefore possible to provide a diaphragm pump capable of improving performance stability and durability performance while employing the configuration capable of suppressing the discharge flow rate to a remarkably low flow rate.

The valve body (31b) may include a seal surface (38) facing the seat surface (35). The leak structure (37) may include an unevenness (41) provided on the seal surface (38). The unevenness (41) may include an angled portion and/or a valley portion having a tilting surface.

The unevenness (41) may be provided all over the seal surface (38). The unevenness (41) may be provided only on the outer edge portion of the seal surface (38), which comes into contact with the seat surface (35) when the suction valve (31) closes the suction through hole (32). The unevenness (41) may be provided at least on the outer edge portion of the seal surface (38).

The unevenness (41) may be an unevenness formed by transferring a shape of a molding surface (42a) for emboss processing, which is provided on a mold (42) used to mold the valve body (31b).

The seat surface (35) may be a smooth surface. When the seat surface (35) is formed into a smooth surface, the leak structure (37) of the valve body (31b) that repetitively comes into contact with the seat surface (35) more hardly wears.

The valve body (31b) of the suction valve (31) may be formed into an annular plate shape. The valve body (31b) may be formed into a shape that is curved to gradually approach the seat surface (35) toward the outer edge.

What is claimed is:

1. A diaphragm pump comprising:
    a diaphragm including a deformation portion having a cup shape;
    a partition configured to close an opening portion of the deformation portion and form a pump chamber together with the deformation portion;
    a suction through hole extending through the partition;
    a suction passage communicating with the pump chamber via the suction through hole;
    a discharge through hole extending through the partition;
    a discharge passage communicating with the pump chamber via the discharge through hole;
    a driving mechanism configured to convert rotation of a motor into a reciprocating motion and alternately deform the deformation portion in a direction of increasing a capacity of the pump chamber and in a direction of decreasing the capacity of the pump chamber;
    a suction valve attached to the partition and configured to open the suction passage in a stroke of increasing the capacity of the pump chamber and close the suction passage in a stroke without increasing the capacity; and
    a discharge valve attached to the partition in the discharge passage and configured to open the discharge passage in a stroke of decreasing the capacity of the pump chamber and close the discharge passage in a stroke without decreasing the capacity,
    the driving mechanism includes a crank body fixed to a rotating shaft of the motor, and a driving body connected to the crank body via a driving shaft tilting with respect to the rotation shaft of the motor,
    the driving body includes a shaft portion connected to the driving shaft, and an arm portion extending from the shaft portion outward in a radial direction and connected to the deformation portion of the diaphragm,
    wherein the partition includes a seat surface on a side facing the pump chamber, and
    the suction valve includes a valve body configured to come into contact with or separate from the seat surface, and the valve body includes a leak structure configured to form a channel between the valve body and the seat surface and leak fluid in the pump chamber through the channel to the suction passage.

2. The diaphragm pump according to claim 1, wherein the valve body includes a seal surface facing the seat surface, and
    the leak structure includes an unevenness provided on the seal surface.

3. The diaphragm pump according to claim 2, wherein the unevenness is provided all over the seal surface.

4. The diaphragm pump according to claim 2, wherein the unevenness is an unevenness formed by transferring a shape of a molding surface for emboss processing, which is provided on a mold used to mold the valve body.

5. The diaphragm pump according to claim 1, wherein the seat surface is a smooth surface.

* * * * *